United States Patent

Hoshino et al.

Patent Number: 5,621,515
Date of Patent: Apr. 15, 1997

[54] IDENTIFICATION SYSTEM USING REGIONS OF PREDETERMINED PROPERTIES INTERSPERSED AMONG REGIONS OF OTHER PROPERTIES

[75] Inventors: Hidekazu Hoshino; Kazuhiro Kitada, both of Kanagawa-ken, Japan

[73] Assignee: NHK Spring Co., Ltd., Kanagawa-ken, Japan

[21] Appl. No.: 366,181

[22] Filed: Dec. 29, 1994

[30] Foreign Application Priority Data

Jan. 25, 1994 [JP] Japan .................. 6-023843

[51] Int. Cl.$^6$ .............. G06K 9/74; G06K 7/10; G03H 1/00; B42D 15/00
[52] U.S. Cl. .................. 356/71; 283/86; 359/2; 235/457; 235/494
[58] Field of Search .................. 356/71; 283/86; 359/2; 235/457–494

[56] References Cited

U.S. PATENT DOCUMENTS

| | | | |
|---|---|---|---|
| 4,211,918 | 7/1980 | Nyfeler et al. | 356/71 |
| 5,200,794 | 4/1993 | Nishiguma et al. | 356/71 |
| 5,291,006 | 3/1994 | Nishiguma et al. | 235/457 |
| 5,300,764 | 4/1994 | Hoshino et al. | 235/487 |
| 5,379,131 | 1/1995 | Yamazaki | 356/71 |
| 5,396,559 | 3/1995 | McGrew | 283/86 |

FOREIGN PATENT DOCUMENTS

0533448A2  3/1993  European Pat. Off. ......... 235/457
92/004692  3/1992  WIPO ......... 235/457

*Primary Examiner*—Frank Gonzalez
*Assistant Examiner*—Jason D. Eisenberg
*Attorney, Agent, or Firm*—Skjerven, Morrill, MacPherson, Franklin & Friel; Alan H. MacPherson; Omkar K. Suryadevara

[57] ABSTRACT

In an article identification system comprising a plurality of identification regions affixed on an article, a light emitting device for impinging an illuminating light beam onto at least some of the identification regions, a light receiving device for detecting light diffracted by the identification regions, and a determination unit for determining the authenticity of the article according to a pattern of diffracted light detected by the light receiving device, the identification regions consist of a combination of effective and ineffective identification regions which are hardly distinguishable by naked eyes. Thus, the potential forger is not able to know which regions are indeed effective without having any access to a genuine optical reader/writer, and has to duplicate all of the identification regions at a substantial cost and requiring a substantial amount of effort. On the other hand, the genuine optical reader/writer can simply disregard all of the ineffective identification regions, and the cost of the article identification system can be substantially reduced. Therefore, for given effort and cost, the effectiveness of the article identification system to discourage illicitly duplication can be increased.

5 Claims, 3 Drawing Sheets

IDENTIFICATION SYSTEM USING REGIONS OF PREDETERMINED PROPERTIES INTERSPERSED AMONG REGIONS OF OTHER PROPERTIES

TECHNICAL FIELD

The present invention relates to an article identification system for identifying the authenticity of an article.

BACKGROUND OF THE INVENTION

Conventionally, identification seals carrying hologram and other marks that cannot be readily forged have been affixed to articles such as credit cards, monetary papers, tickets and commercial goods to discourage any attempts to illicitly duplicate them.

These identification seals are normally intended to be visually identified, and are therefore placed in highly visible places. These identification seals are thus so visible that it is relatively easy for a potential forger to analyze the structure of the identification seals. Furthermore, forgery of such identification seals is relatively easy because it suffices if the forged identification seal can successfully deceive the eye of the user.

It was also proposed to use an optical reader to identify an identification seal. Examples of such article identification systems are found in the description of a number of commonly assigned United States patents, and for more details of this technical field reference should be made, for instance, to U.S. Pat. Nos. 5,300,764 issued Apr. 5, 1994, 5,291,006 issued Mar. 1, 1994, and 5,200,794 issued Apr. 6, 1993. Because the identification process is carried out by a machine, the accuracy of identification is improved as compared to the naked eye, and forgery can be prevented even more effectively. However, it still is possible for a potential forger to locate the position of the identification region, and to analyze it with a certain amount of effort.

BRIEF SUMMARY OF THE INVENTION

In view of such problems of the prior art, a primary object of the present invention is to provide an article identification system which is highly effective in discouraging any attempts to illicitly duplicate the identification region.

A second object of the present invention is to provide an article identification system which can maximize the effectiveness of the identification system at a minimum cost.

A third object of the present invention is to provide an article identification system which can be implemented in an existing article identification system with a minimum amount of modification.

According to the present invention, these and other objects can be accomplished by providing an article identification system comprising a plurality of identification regions affixed on an article, a light emitting device for impinging an illuminating light beam onto at least some of the identification regions, a light receiving device for detecting light diffracted by the identification regions, and a determination unit for determining the authenticity of the article according to a pattern of diffracted light detected by the light receiving device, wherein the identification regions consist of a combination of effective and ineffective identification regions which are hardly distinguishable by naked eyes.

Thus, the potential forger is not able to know which regions are indeed effective without having any access to a genuine optical reader/writer, and has to duplicate all of the identification regions at a substantial cost and requiring a substantial amount of effort. On the other hand, the genuine optical reader/writer can simply disregard all of the ineffective identification regions, and the cost of the article identification system can be substantially reduced. Therefore, for given effort and cost, the effectiveness of the article identification system to discourage illicit duplication can be increased.

According to the preferred embodiments of the present invention, the effective identification regions have a prescribed diffractive property, and the ineffective identification regions have one or a plurality of diffractive properties different from that of the effective identification regions. The diffractive properties may be readily detected by an optical reader, but are not easily distinguishable by naked eyes. Obviously, the effective identification regions may consist of a plurality of regions having a combination of different identification regions. In this case, it is possible to encode data in the identification regions.

If the effective identification regions are arranged along a track defined on the article adapted to be scanned by the light emitting and receiving devices, the optical reader can read the effective identification regions with a simple structure and in a short time.

By detecting the arrangement or the distribution of the effective identification region, and detecting the length of each of the effective identification regions, it is possible to encode useful data in the identification regions, and to even more effectively discourage any attempts to illicitly duplicate the identification regions.

BRIEF DESCRIPTION OF THE DRAWINGS

Now the present invention is described in the following with reference to the appended drawings, in which:

FIGS. 6b-1 to 6b-4 illustrate signals from the respective sectors (8a, 8e), (8b, 8f), (8c, 8g), and (8d, 8h).

DETAILED DESCRIPTION OF THE PREFERRED EMBODIMENTS

Figure 1:
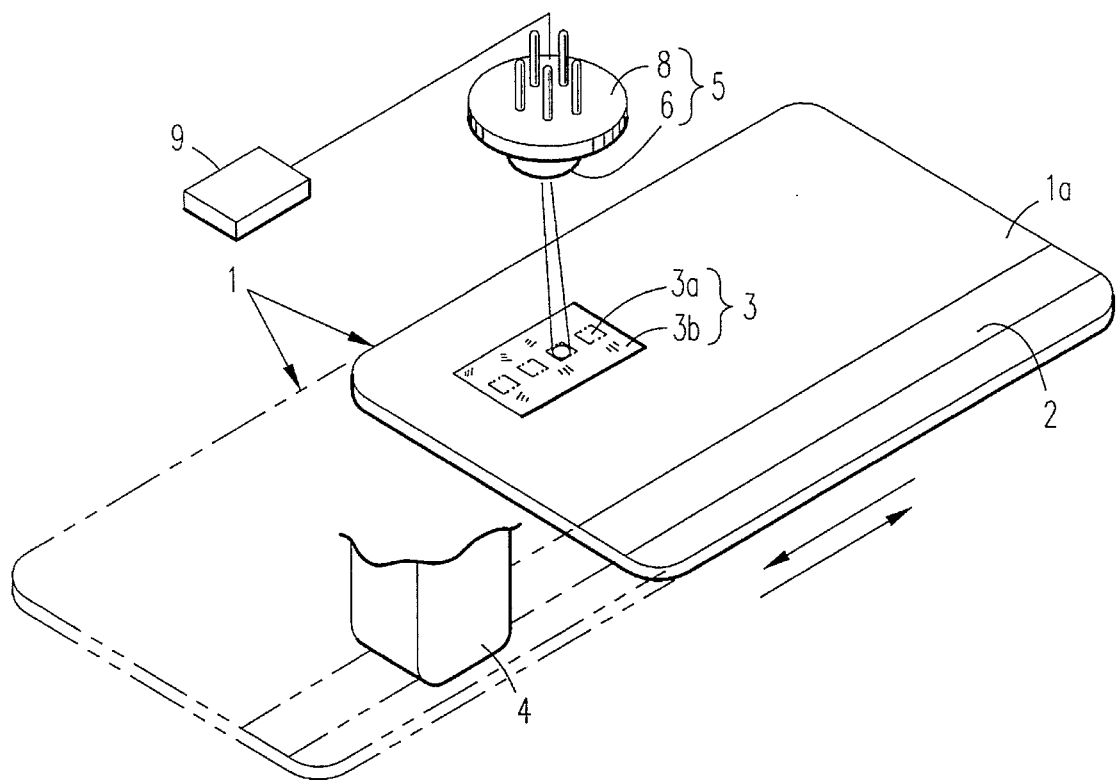
FIG. 1 is a perspective view of an essential part of a first embodiment of the present invention applied to a system for identifying the authenticity of a magnetic card.
Figure 2:
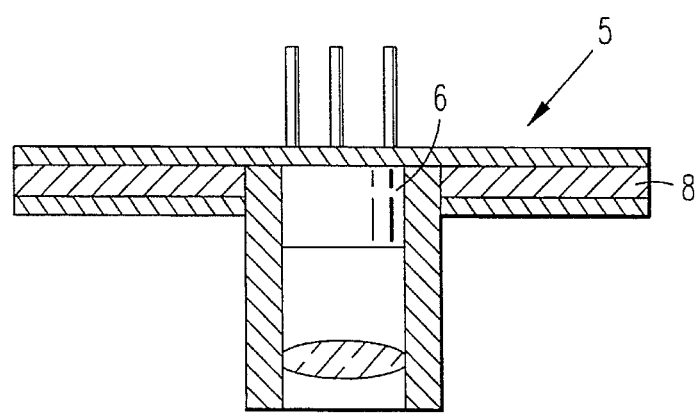
FIG. 2 is a sectional side view of the light emitting device and the light receiving device.
Figure 3:
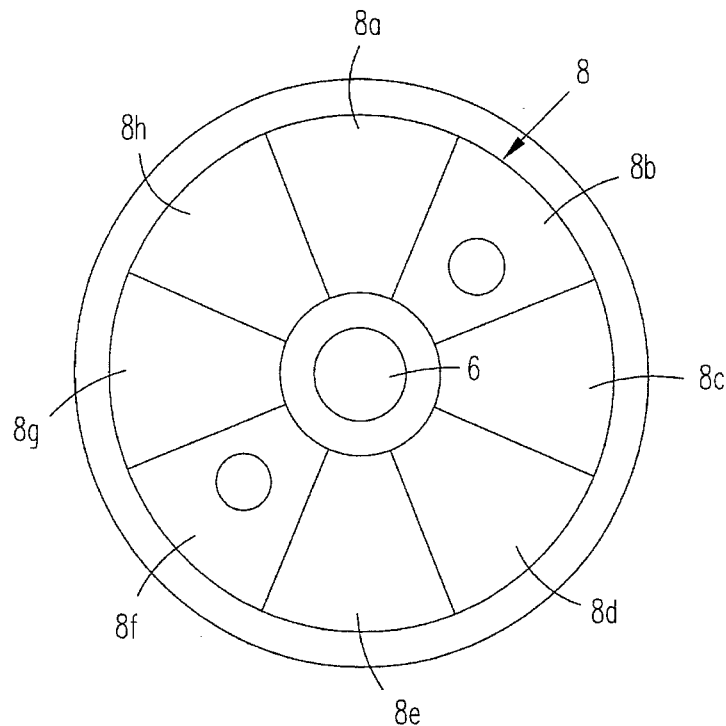
FIG. 3 is a plan view of the light emitting device and the light receiving device.

FIGS. 1 through 4 show a first embodiment of the present invention applied to a magnetic card. As best illustrated in FIG. 1, this magnetic card 1 carries a magnetic stripe 2 extending along a long side of the card 1 on a front surface 1a thereof. The surface 1a is also provided with a mark, which may be either a seal attached to the card surface or printed directly on the card surface, serving as an identification area 3. As described in more detail hereinafter, the identification area 3 includes true identification regions 3a and fake identification regions 3b.

A card reader/writer is provided with a magnetic head 4 which opposes the magnetic stripe 2 as the magnetic card 1 is conveyed through the card reader/writer by card conveying means not shown in the drawings. The card reader/writer is additionally provided with a light emitting/receiving unit 5 so as to be opposite the true identification regions 3a as the magnetic card 1 is conveyed through the card reader/writer. The light emitting/receiving unit 5 comprises a light emitting device 6 which projects an illuminating light beam having the wavelength of 780 nm onto the true identification regions 3a, and an annular light receiving device 8 concentrically surrounding the light emitting device 6 (refer to FIGS. 2 and 3). The light emitting device 6 is so positioned as to be opposite the true identification regions 3a when the card 1 is placed at prescribed locations in the card reader/writer. The light receiving device 8 consists of a multi-segment photodiode which is divided into eight identical sectors 8a to 8h (FIG. 3) each capable of individually detecting light, and is connected to a determination unit 9 (FIG. 1) which consists of a CPU, memory, and interface circuits, and is adapted to analyze the output from the light receiving device 8 to determine the authenticity of the magnetic card 1.

Figure 4:
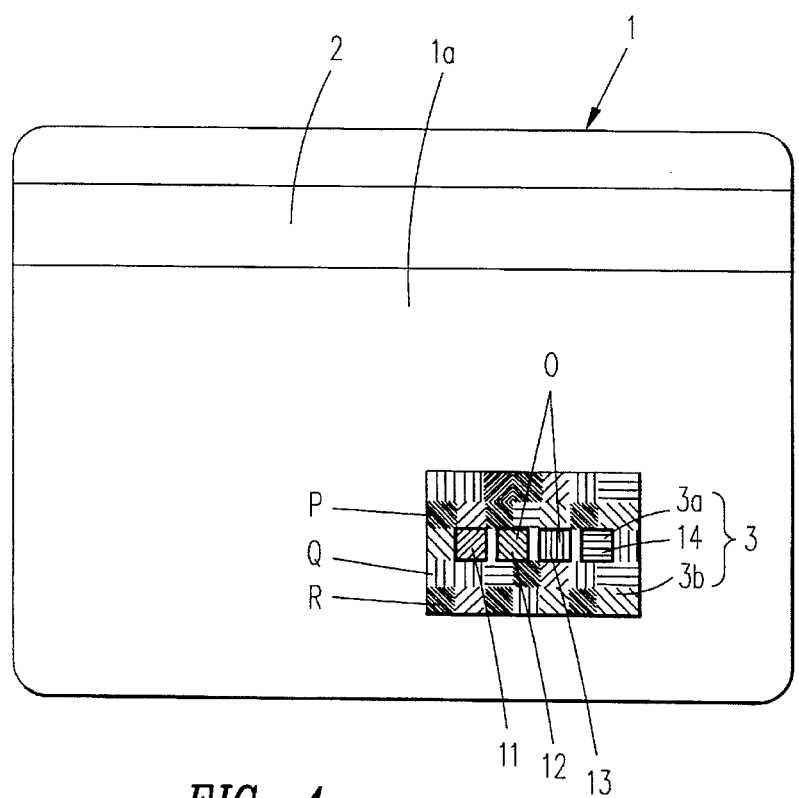
FIG. 4 is an enlarged plan view of the identification regions including true identification regions and fake identification regions.
Figure 5:
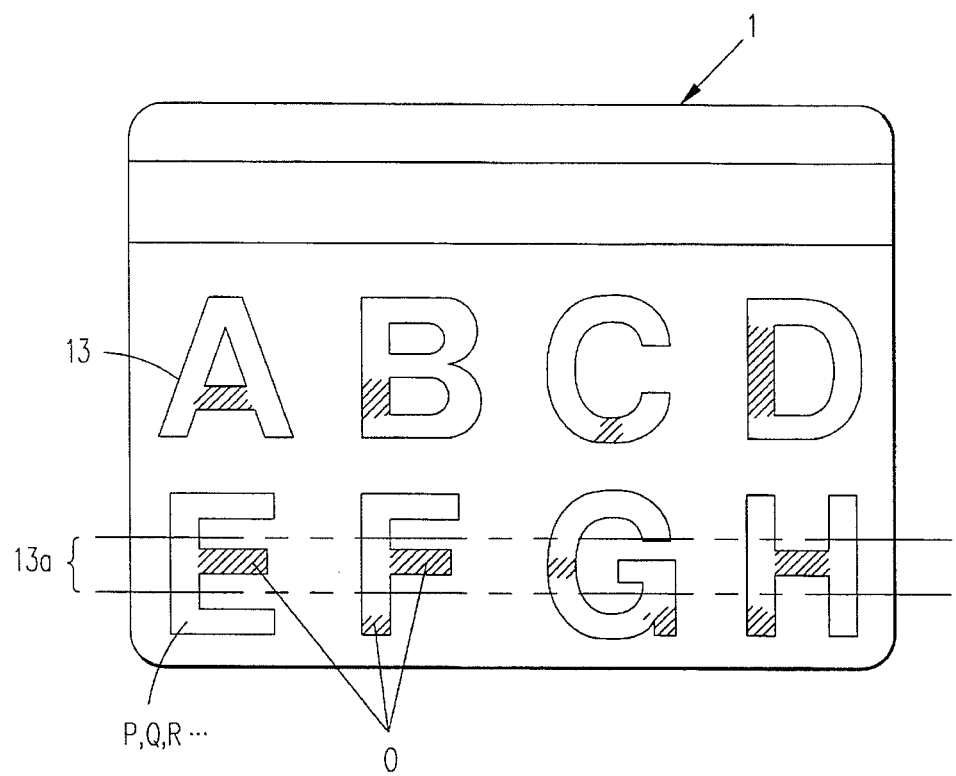
FIG. 5 is a view similar to FIG. 4 showing a second embodiment of the present invention.
Figure 6A:
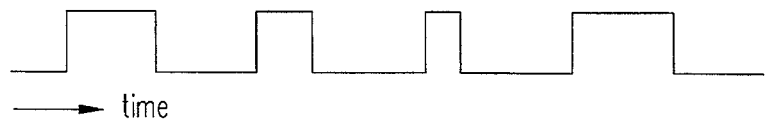
FIG. 6a illustrates an output signal from the light receiving device of FIG. 3.
Figures 1, 6B:
Figures 2, 6B:
Figures 3, 6B:
Figures 4, 6B:

As best illustrated in FIG. 4, the identification region 3 is provided in a part of the front surface of the magnetic card 1 not interfering with the magnetic stripe 2, and the four patches 11, 12, 13 and 14 surrounded by the imaginary lines are defined as the true identification regions 3a consisting of holograms and demonstrating a certain diffractive property that can be detected by the light emitting/receiving unit 5. The diffractive property of the hologram O of the true identification regions 3a is such that when the hologram is precisely opposite the light emitting/receiving unit 5 the resulting diffracted light impinges upon a prescribed pair or pairs of sectors 8a to 8h diagonally opposing each other. Thus, which pair or pairs of the sectors 8a to 8h will detect the diffracted light depends on the specific diffractive property of the hologram O. The remaining holograms P, Q and R of the fake identification regions 3b have different diffractive properties from that of the hologram O.

When actually identifying the authenticity of the card 1, the card 1 is conveyed to positions at which the light emitting device 6 of the light emitting/receiving unit 5 opposes the true identification regions 3a. Then, an illuminating light having the wavelength of 780 nm is emitted from the light emitting device 6 and impinged upon each of the true identification regions 3a. The light diffracted by each of the true identification regions 3a impinges upon a prescribed pair of the eight sectors 8a to 8h of the light receiving device 8, and the authenticity of the card 1 can be verified by the distribution of the intensities of the light received by the eight sectors 8a to 8h. By rotating the direction of diffraction of each of the true identification regions 3a, it is possible to obtain four possible light emitting patterns in terms of the intensities of light received by the eight sectors in the case where the diffracted light impinges upon a symmetric pair of the eight sectors; (1) sectors 8a and 8e, (2) sectors 8b and 8f, (3) sectors 8c and 8g, and (4) sectors 8d and 8h. Therefore, by determining the rotational angle of the hologram O, it is possible to identify the authenticity of the card 1 according to the presence of a hologram and the direction of diffraction.

Therefore, when a potential forger obtains an authentic magnetic card 1 with the intention of illicitly duplicating the identification area 3, he has to duplicate not only the true identification regions 3a but also the fake identification region 3b as he has no way of knowing which of the regions are indeed essential without having any access to a genuine card reader/writer. Even if he gains access to a genuine card reader/writer, as it is difficult enough to analyze the diffractive property of the hologram, it would be extremely difficult for him to successfully duplicate it.

The identification area was provided only in a part of the front surface 1a of the magnetic card 1 in the above described embodiment, but the identification regions may be distributed substantially over the entire front surface 1a of the magnetic card 1. In this case, the true identification regions 3a can be hidden in hardly noticeable parts of the card surface, and the difficulty in finding the true identification regions 3a can be made even more increased.

FIGS. 5 and 6a, 6b-1, 6b-2, 6b-3 and 6b-4 show a second embodiment of the present invention which is also applied to a magnetic data storage card, and the parts corresponding to those of the previous embodiment are denoted with like numerals.

In this embodiment, eight letters A, B, C, D, E, F, G and H are printed, attached or otherwise affixed on the front surface 1a of the card 1, and some parts of the letter regions (shaded regions in FIG. 2) consist of a hologram O having a prescribed identifiable diffractive property while the remaining parts of the letter regions consist of holograms P, Q and R having diffractive properties different from that of the hologram O. In this embodiment, the true identification regions 13a consist of patches arranged along a track defined along a long side of the card 1 so that the light emitting/receiving unit 5 can scan the true identification regions 13a as the card 1 is conveyed through the card reader/writer. The card reader/writer may simply detect the presence of the true identification regions 13a. More preferably, the card reader/writer detects the length of each of the true identification regions 13a, and the distribution of the true identification regions 13 so that the card 1 is identified to be authentic only when the true identification regions 13a are arranged in a prescribed pattern and have a prescribed combination of lengths. The remaining parts of the letter regions consist of fake identification regions 13b which are intended to camouflage or conceal the true identification regions 13a from the eyes of potential forgers.

In this embodiment also, depending on the direction of diffraction of each of the identification regions 13a and 13b, there are four possible patterns of light received by the different sectors 8a to 8h of the light receiving device 8. Thus, the authenticity of the card 1 can be identified according to the distribution, the lengths and the directions of diffraction of the identification regions 13. An example of the pattern of the signals obtained by the different sectors 8a to 8h of the light receiving device 8 is given in FIGS. 6a, 6b-1, 6b-2, 6b-3 and 6b-4.

Therefore, even when a person contemplating forgery has obtained an authentic card 1, it is extremely difficult for him to distinguish the true identification regions 13a from the fake identification regions 13b if he has no access to a genuine card reader/writer. Even if he succeeded in distinguishing the different diffractive properties of the identification area 13, he still would not be able to determine which of the identification regions are indeed true identification regions.

Thus, unless the entire hologram area is reproduced, it is virtually impossible to successfully duplicate the identification regions. However, it is extremely expensive and requires a high level of technology to reproduce holograms in a complex arrangement, and it is not practical to make any attempt to illicitly duplicate the card 1. Also, by changing the positions of the true identification regions 13a from time to time, attempts to forge the card will be even more effectively prevented.

The present invention is not limited to the above described embodiments, and various other embodiments are possible. For instance, in the above described embodiment, the diffractive properties of the holograms were such that the diffracted light impinged upon a pair of symmetrically placed sectors of the light receiving device 8 in each case. However, the diffractive property of the holograms can be designed so that the diffracted light impinges upon only one of the sectors or upon three or more of the sectors. By thus diversifying the possible patterns of diffracted light, it is possible to store a large amount of useful information in the identification regions.

In the above described embodiments, the identification regions were affixed on a card, but the present invention can be applied to other articles such as monetary papers such as checks, bonds, promissory notes and coupons, commercial goods in general, and packages for commercial goods. The term hologram as used in this description should be interpreted in its broadest sense, and includes various forms of diffraction grating.

What we claim is:

1. An article identification system comprising a plurality of identification regions affixed on an article, a light emitting device for impinging an illuminating light beam onto at least some of said identification regions, a light receiving device for detecting light diffracted by said identification regions, and a determination unit for determining authenticity of said article according to a pattern of diffracted light detected by said light receiving device, wherein said light receiving device comprises a plurality of sectors around the light emitting device;

wherein said identification regions further comprise a combination of effective and ineffective regions which are substantially indistinguishable from each other by naked eyes;

wherein at least two of said effective identification regions have diffractive properties different from each other, and said ineffective identification regions have at least one diffractive property different from those of said effective identification regions;

wherein said pattern of diffracted light is formed by encoded data wherein said encoded data is in said effective identification region; and wherein the authenticity is determined by said determination unit based on where said diffracted light leaving said encoded data impinges on predetermined sectors in said plurality of sectors of said light receiving element.

2. An article identification system according to claim 1, wherein said effective identification regions are arranged along a track defined on said article for scanning by said light emitting and receiving devices.

3. An article identification system according to claim 2, wherein said light emitting and receiving devices and said determination unit detect the length of each of said effective identification regions.

4. An article identification system according to claim 1, wherein the light receiving device comprises a plurality of sectors concentrically surrounding the light emitting device.

5. An article identification system according to claim 1, wherein said article has a front surface and further wherein said effective identification regions are distributed substantially over the front surface.

* * * * *